United States Patent

[11] 3,587,135

[72] Inventors Louis F. Carrieri
 La Grange Park;
 Edwin A. Spanke, Oak Forest, Ill.
[21] Appl. No. 832,141
[22] Filed June 11, 1969
[45] Patented June 28, 1971

[54] COMPRESSION MOLDING MACHINE
 12 Claims, 6 Drawing Figs.
[52] U.S. Cl. ...................................................... 18/16,
 18/30
[51] Int. Cl. ........................................................ B30b 15/16
[50] Field of Search ........................................... 18/16 (C),
 17 (C), 30 (CK), (CR), (LM), (LV), 42 (I), 43

[56] References Cited
 UNITED STATES PATENTS
2,333,601 11/1943 Tucker ........................... 18/30
2,923,973 2/1960 Ninneman ...................... 18/16
3,158,903 12/1964 Fischer et al. .................. 18/30X
3,160,919 12/1964 Carter ............................ 18/30X
3,172,155 3/1965 Wengel .......................... 18/30X
3,176,348 4/1965 Schmuck et al. ............... 18/3X
3,245,122 4/1966 Maurer .......................... 18/30X Primary Examiner—J. Harold Flint, Jr.
Attorney—Johnston, Root, O'Keeffe, Keil, Thompson and Shurtleff ABSTRACT: A compression molding machine wherein an upper slide carrying an upper mold part is allowed to slide downwardly by gravity to the lower mold part mounted on the press bed and wherein pull rods thereafter pull the slide downwardly. A clamping unit at the bottom of the press, one for each pull rod, adjustably secures the lower end of the pull rod therein. The clamping units are hydraulically actuated to move a piston downwardly which in turn moves the pull rod associated therewith and the slide downwardly into contact with a hydraulically supported stop piston. By the time the actuating piston reaches the stop piston, the mold will have been filled out by the plastic therein and then further movement of the actuating piston will move the stop piston downwardly for further compression and to take up material shrinkage and produce a good finish. The actuating piston is adjustable so that the working stroke of the slide will be only that which is necessary for the particular piece being molded.

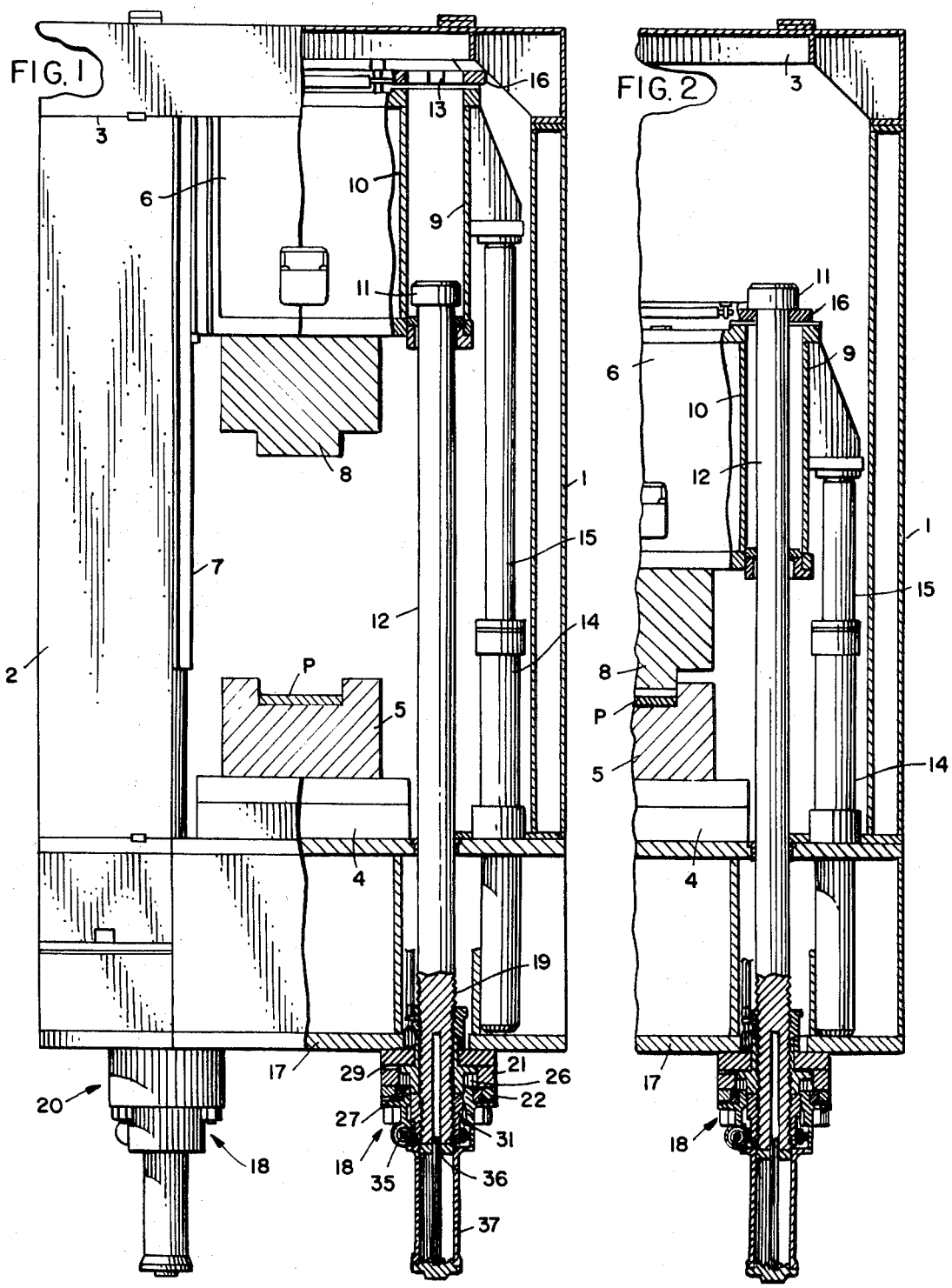

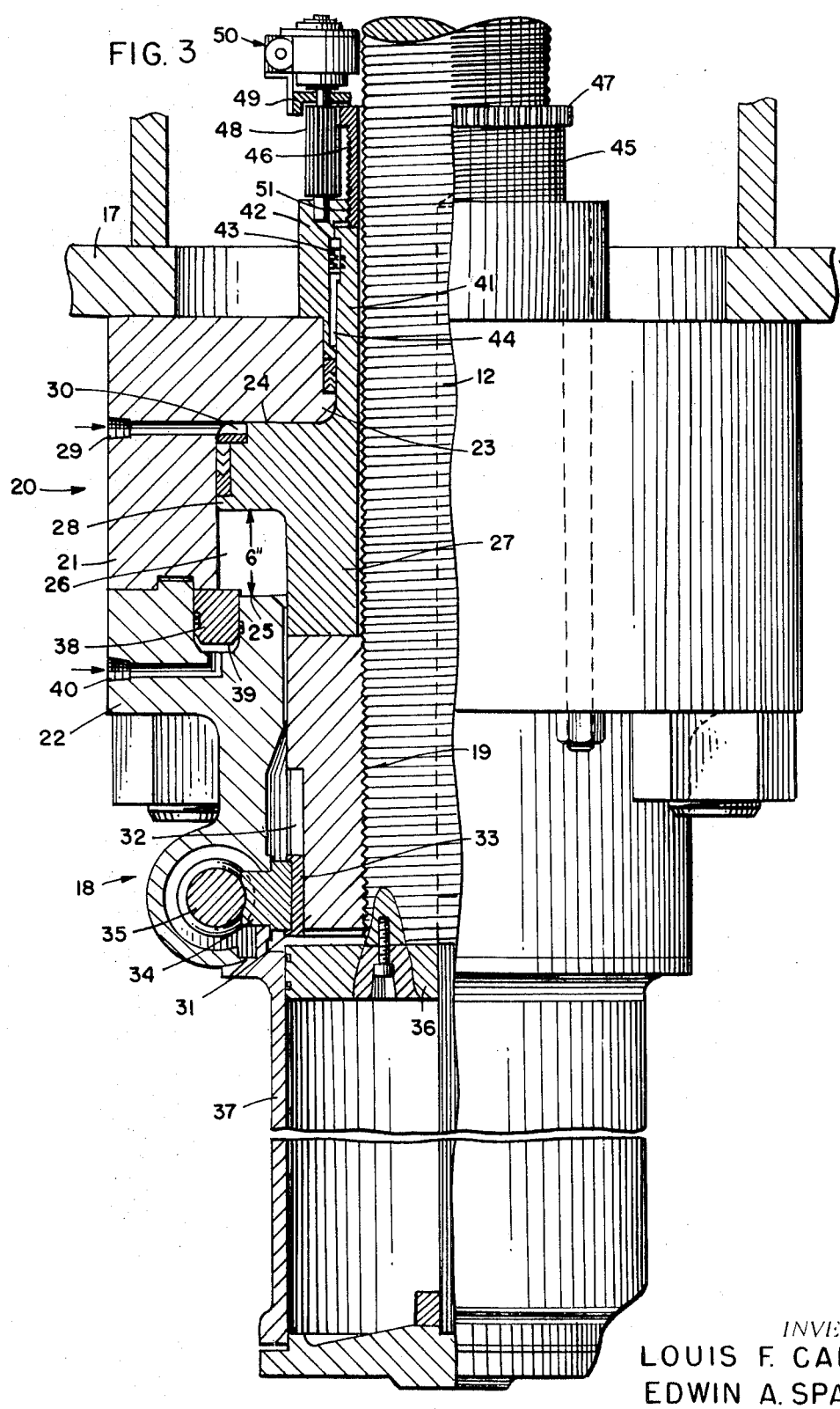

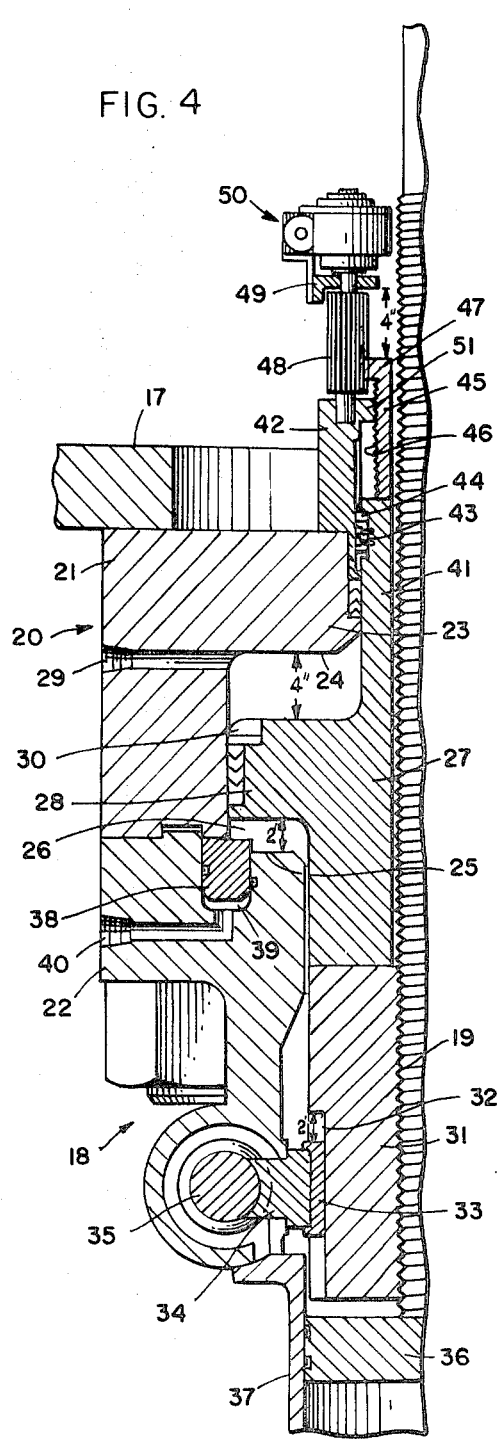
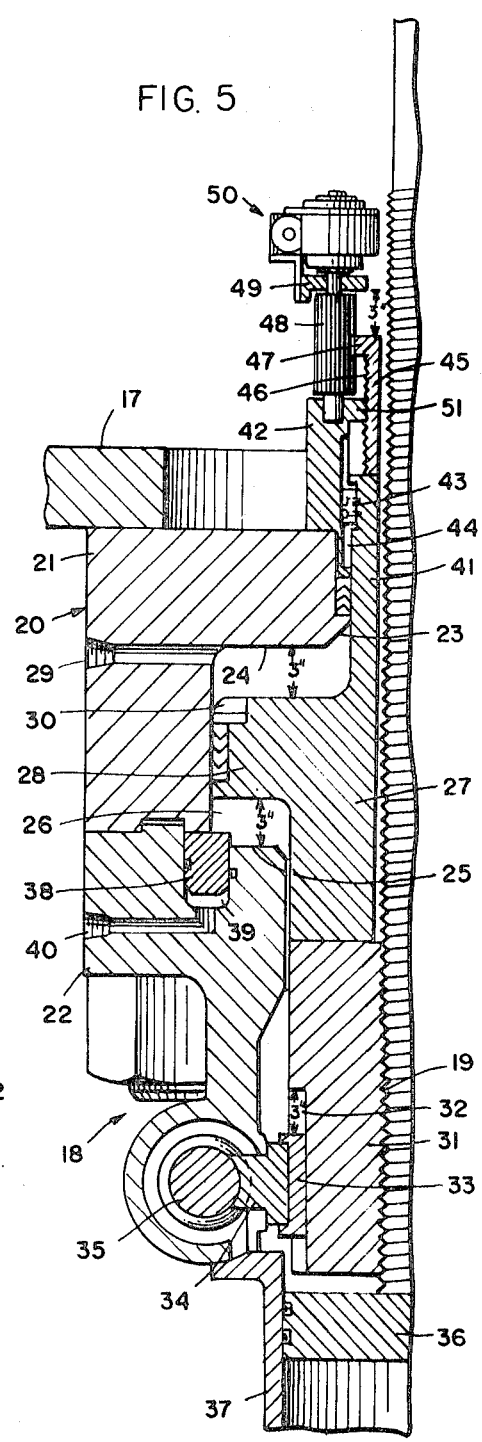
INVENTORS:
LOUIS F. CARRIERI
EDWIN A. SPANKE 3,587,135

COMPRESSION MOLDING MACHINE

BRIEF SUMMARY OF THE INVENTION

The compression molding machine of the present invention is similar in many respects to the earlier filed copending application of Carrieri and Skinner, Ser. No. 831,098, filed June 6, 1969. Both machines are vertical and both are provided with upper slides having dies or mold parts mounted thereon, and moved downwardly by gravity to the lower die or mold part. Both are provided with a plurality of pull rods or tension rods, each of which is mounted in a clamping unit at the bottom of the press and extend upwardly through the upper slide. In both instances, the lower end of each pull rod is adjustably mounted within a clamping unit. The above referred to application, however, discloses a vertical injection molding machine wherein the two die parts are clamped together to form a die cavity into which a plastic material is injected. The present invention, on the other hand, is directed to a compression molding machine wherein a quantity of a plastic material is initially located within the lower mold part whereupon the upper mold part is moved downwardly into contact therewith and compression of the two mold parts will force the plastic material into all parts of the mold.

It is important in a compression molding machine that when the upper slide carrying the upper mold part has reached its lowermost position at the end of the downstroke cycle, the mold will have been completely filled by the plastic material therein and that each part of the mold and particularly at the corners thereof, be adjusted to precisely the right height so as to provide the proper thickness of the molded part in all areas thereof.

Each of the pull rods has an enlarged head at the upper end thereof, which extends upwardly beyond the top of the upper slide when said slide is in its lower position. Initially the slide will have a rapid closing stroke at which point locking latches will close upon the upper end of each rod below the enlarged head thereof, so that a downward pull on the rods will force the slide and upper mold part downwardly still further. A clamping unit at the bottom of the press is provided for each of the pull rods. An actuating piston in each clamping cylinder is actuated by hydraulic fluid to pull the rod downwardly until a stop piston is reached. By this time, the mold will have been filled out and the finishing part of the stroke then takes place where the actuating piston and the stop piston both move downwardly.

The lower end of each of the pull rods is threaded and is adjustably engaged with a rotatable adjusting nut whereby the position of each pull rod with respect to the upper slide may be adjusted. In addition to this, however, a further adjustment is provided for in each of the clamping cylinders so that the working stroke of the upper slide may be adjusted for different heights of mold parts.

For example, if it is assumed that the maximum working stroke of the slide is 6 inches, then there may be some mold parts which will require only a 2-inch or a 3-inch, or less, stroke. This is accomplished in the present invention by adjusting the initial position of the actuating piston within each of the clamping units, so that the initial starting position thereof is the required distance from the stop piston. Thus, the actuating piston may not return to its uppermost position, if the stroke is to be less than the maximum.

With the foregoing considerations in mind, it is a principle object of the present invention to provide a novel form of vertical compression molding machine wherein an upper movable slide carrying the upper mold part has an initial rapid closing stroke and thereafter has a working stroke through a predetermined distance to fill out the mold cavity and then a final or finishing work stroke.

Another object of the invention is to provide a vertical compression molding machine wherein the working stroke of the upper slide carrying the upper mold part therewith may be varied between maximum and minimum work stroke distances.

A still further and more specific object of the invention is to provide a vertical compression molding machine wherein each corner of the upper slide and mold part may be individually adjusted, thereby to insure control of the mold part thickness at each part of the mold.

Other objects and advantages of the invention will become apparent upon reading the following description, taken in conjunction with the accompanying drawings, in which:

FIG. 1 is a front elevational view, partly in section, of a vertical compression molding machine embodying the present invention, and showing the upper slide with the upper mold part thereon in the uppermost position thereof;

FIG. 2 is a fragmentary view, similar to FIG. 1, but showing the upper slide and mold part in a lower position;

FIG. 3 is an enlarged fragmentary view, partly in section and partly in elevation, of one of the clamping units;

FIG. 4 is a fragmentary sectional view, similar to FIG. 3, but showing the actuating piston therein after it has been adjusted downwardly to shorten the actuating stroke;

FIG. 5 is a view similar to FIG. 4, but showing the actuating piston therein adjusted downwardly a shorter distance, so that a longer actuating stroke may take place less than the maximum.

DETAILED DESCRIPTION

Figure 6:
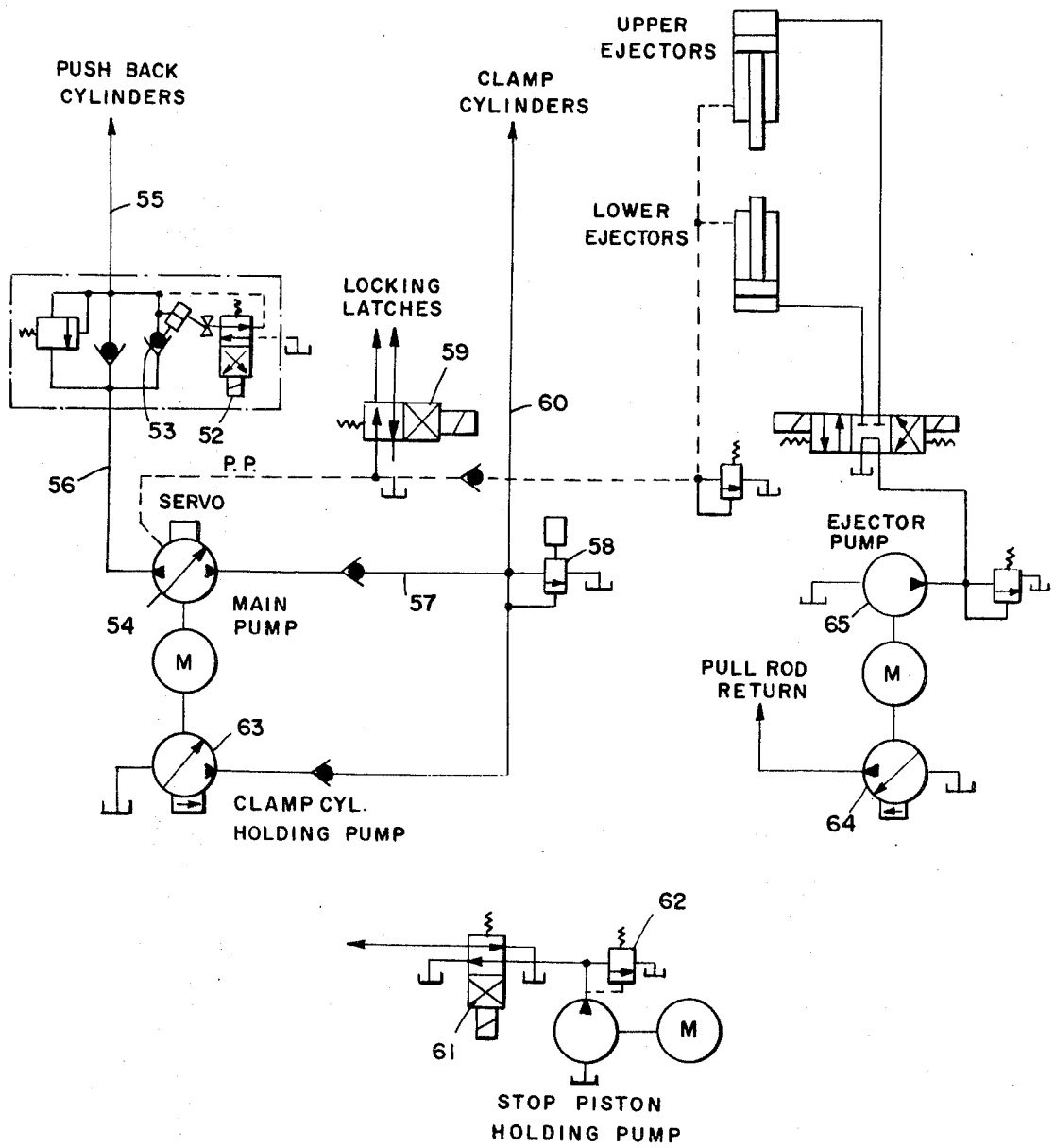
FIG. 6 is a schematic illustration of the hydraulic circuitry utilized in carrying out the various operations of the machine.

Referring now more particularly to the drawings and especially to FIGS. 1 and 2, it will be seen that the machine to which the present invention is applied, consists of opposed uprights, or side frame members 1 and 2 with a crown 3 at the top thereof and spanning the two uprights. A bed 4 at the lower part of the machine is adapted to have a suitable mold part 5 mounted thereon of any suitable configuration, depending upon the particular part being molded. In the upper part of the machine, there is positioned an upper movable slide member 6 adapted to be moved in a vertical direction and to be guided by gibs 7. The upper slide is adapted to have an upper mold part 8 secured thereto which cooperates with the lower mold part 5 when the two parts are brought together for the purpose of forming the particular piece or part being molded.

The upper slide is provided with an outer wall 9 and an inwardly spaced inner wall 10 at each side thereof, thereby to provide a space within which the enlarged head 11 of a pull rod 12 may be received. Each pull rod, of which there are usually four, is fixed with respect to the upper slide during the rapid closing stroke thereof. There is an opening 13 at the upper part of the slide so that when the slide moves downwardly the head 11 of each pull rod 12 may pass therethrough to the position above the slide as shown in FIG. 2.

A plurality of pushback cylinders 14 having pistons 15 movable therein, are adapted to support the slide in its uppermost position by hydraulic pressure. During the rapid closing stroke of the slide, the hydraulic fluid in each of the cylinders 14 will be pumped therefrom, thereby allowing the upper slide and mold part to drop downwardly rapidly by gravity.

After the slide has moved downwardly to complete the rapid closing stroke thereof, the head 11 of each of the pull rods will be positioned above the slide. At this time, locking latches 16 will close upon the upper end of each rod so as to be positioned immediately below the enlarged head 11 thereof. The manner of operation of these locking latches is more clearly illustrated in the earlier filed copending application of Carrieri et al., Ser. No. 661,918, filed Aug. 21, 1967, now U.S. Pat. No. 3,540,081. These latches, however, consist essentially of opposed arms, each having an arcuate recess therein, and movable toward and away from each other. When away from each other, as shown in FIG. 1, the slide is free to move with respect to the pull rods, but when in closed position, as shown in FIG. 2, the pull rods and slide thereafter, move downwardly together by reason of a pulling force exerting on each pull rod adjacent the lower end thereof, as will be seen presently.

The bottom of the press below the bed is provided with plate 17 to the underside of which is secured a plurality of actuating units 18. There is one actuating unit provided for each of the pull rods 12. The lower end of each of the pull rods 12 is threaded as indicated at 19.

Each of the actuating units includes a cylinder 20 consisting of the upper and lower sections 21 and 22. The upper section 21 is provided with an inwardly extending portion of smaller diameter as indicated at 23, thereby providing a downwardly facing shoulder 24. The lower section 22 has an upwardly facing surface 25, thereby providing an annular recess 26 between the shou.der 24 and the surface 25.

An actuating piston 27 has a portion 28 of larger diameter than the remaining part thereof, which portion 28 extends into the annular recess 26. The axial length of the recess 26 is greater than the axial length of the portion 28 of the actuating piston 27, thereby permitting the piston to have a vertical sliding movement within the annular recess 26. As will presently be seen, the amount of axial movement of the actuating piston 27 will be the working stroke of the upper mold part. The actuating piston 27 may also be adjusted to vary the length of the working stroke as will also be seen hereinafter.

As shown in FIG. 3, the piston 27 is in its uppermost position from which it may be moved through the maximum working stroke, and where the upper surface of the portion 28 is in contact with the shoulder 24 on the actuating cylinder. The maximum stroke, which may be imparted to the actuating piston 27 and thus, to the upper mold part, may of course, be varied, depending upon the requirements of the machine. For purposes of illustration however, it may be assumed that the machine has been designed for a maximum working stroke of, say, 6 inches, so that the distance between the surface 25, as seen in FIG. 3, and the undersurface of the portion 28, would be 6 inches.

From the position of the various parts as shown in FIG. 1, the rapid closing stroke takes place, which is the initial part of the machine cycle. The position of the two mold parts 5 and 8 at the end of the rapid closing stroke, will depend upon the height of the plastic material in the lower mold part which is to be molded into a final product. The upper mold part 8, however, will be caused to stop short of the plastic material in the mold by the actuation of a suitable limit switch (not shown). At the end of this rapid closing stroke, however, the mold parts will be substantially as shown in FIG. 2 where the upper mold part is spaced upwardly from the plastic material illustrated by the letter P and where the head 11 of each pull rod 12 will be located above the upper slide.

In actual practice, there will be a slight spacing between the head 11 of each pull rod and the associated locking latches 16 to enable such latches to close freely. The working stroke will then begin by a downward pull on the pull rods 12 which is accomplished by hydraulic fluid pressure on the actuating piston 27 in each of the actuating units 18.

A hydraulic fluid inlet 29 is provided in the upper section 21 of the actuating cylinder 20. This inlet leads into the upper part of the annular recess 26. The portion 28 of larger diameter on the actuating piston 27 is offset at the upper circumferential edge thereof, thereby to provide the upper annular recess 30 into which the inlet 29 leads.

It will be evident that when hydraulic fluid under pressure enters the inlet 29 and the annular recess 30, downward pressure will be exerted on the actuating piston 27, thereby moving it downwardly for the working stroke.

The lower end of each pull rod 12 threadedly engages an adjusting nut 31 in each of the actuating units, which, in turn, is provided with a keyway 32. The adjusting nut 31 is keyed by means of the key 33 to a worm gear 34 adapted to be rotated by operation of a worm 35. It will be evident that when the worm gear 34 is rotated by the worm 35, it will carry with it the adjusting nut 31 and thereupon move the associated pull rod 12 upwardly or downwardly because of the threaded engagement thereof with the adjusting nut 31.

The lower end of each pull rod 12 is illustrated as having affixed thereto a piston 36 adapted to reciprocate within a counterbalancing cylinder 37, which contains either hydraulic fluid or air under pressure. When hydraulic fluid under pressure is admitted through the inlet 29 to move the actuating piston 27 downwardly, it will be evident from FIGS. 3, 4 and 5 that such downward movement will also move the adjusting nut 31 downwardly therewith. When this occurs, and because of the threaded engagement thereof with the associated rod 12, the rod and its connected piston 36 will also move downwardly against the fluid pressure within the counterbalancing cylinder.

Such downward movement of the pull rods 12 will move the upper slide and the mold part mounted thereon downwardly against the plastic material P. This working stroke will continue until the enlarged portion 28 of the actuating piston 27 in each unit, reaches a stop piston 38, which is axially movable within an annular recess 39 in the lower section 22 of the cylinder 20. Each of the stop pistons 38 is normally held in its upper position under hydraulic fluid pressure which enters the annular recess 39 through a fluid inlet 40 below the stop piston 38.

All of the actuating pistons 27 will not bottom on their associated stop piston 38 at the same time, due to the nonuniform placement of the plastic material in the mold cavity.

During this working stroke, the mold will be filled out by the plastic material as the actuating pistons 27 approach their respective stop pistons. When all of the actuating pistons 27 have come into contact with their respective stop pistons, they dwell in their position for partial curing and for a matter of a few seconds, insuring uniform wall thickness.

The final finishing stroke then takes place wherein the hydraulic fluid pressure against the underside of the stop piston 38 in each unit, is relieved, whereupon the fluid pressure above the actuating piston 27 takes over to move said actuating piston and the stop piston downwardly for the remaining distance limited by the lower wall of the two annular recesses 26 and 39. This final finishing stroke assures not only a good finish on the product, but also compensates for any possible shrinkage which might have taken place in the plastic material during the partial curing.

After completion of the cure with the upper mold part in its lowermost position, the hydraulic pressure above the piston 27 will then be relieved and fluid pressure through the inlet 40 to the annular space 39 below the stop piston 38 will again be exerted to urge the piston 38 upwardly to the position thereof shown in FIGS. 3, 4 and 5. Also, the pressure in the counterbalancing cylinder 37, whether it be air or hydraulic fluid, will aid in returning the piston 36, the rod 12, the adjusting nut 31, and the actuating piston 27, to the uppermost position thereof, at which time the locking latches 16 will be withdrawn, thereby permitting the upper slide and mold part mounted thereon to be elevated back to its position shown in FIG. 1 by reason of the hydraulic fluid pressure reentering the lift cylinder 14. The final molded product is then removed another amount of plastic placed in the lower mold part and the operation is then repeated.

As indicated previously herein, the position of the pull rods 12 may be adjusted upwardly or downwardly through the medium of the adjusting nut 31. All of these pull rods may be adjusted mechanically by the worm 35 associated with each actuating unit, which rotates the worm gear 34 in mesh therewith and keyed to the adjusting nut 31. When this occurs, the rod associated therewith in threaded engagement with the adjusting nut will be caused to move upwardly or downwardly. These adjusting nuts may also be operated individually so that the position of each corner of the upper mold part with respect to the lower mold part may be regulated for the purpose of obtaining a uniform wall thickness.

In addition to this adjustment however, the working stroke of the actuating piston 27 may also be adjusted so that it may move through a distance less than the maximum heretofore described, in instances where the amount of plastic material present in the lower mold part is less or where the final product is to have thin walls.

It will be noted that the actuating piston 27 in each of the actuating units is provided with an upwardly extending neck portion 41 of a diameter smaller than that of the enlarged portion 28 thereon. This neck 41 extends upwardly beyond the actuating cylinder 20 and through an opening in the plate member 17.

An annular bushing 42 is secured within the said opening and surrounds the upper part of the neck 41. A key 43 is fastened to the neck 41 of the actuating piston and is adapted to move vertically in a keyway 44 in the bushing 42. Immediately above the neck 41 and the plate 17, there is provided an externally threaded collar 45 having threads 46 thereon as shown in FIG. 3. The upper end of the collar 45 is formed into a ring gear 47 having spur teeth thereon.

A vertically positioned elongated spur gear 48 is mounted for rotation between the upper end of the bushing 42 and a bearing member 49 located thereabove. The spur gear 48 is in mesh with the spur teeth on the ring gear 47 so that rotation of the spur gear 48 will rotate the collar 45.

Rotation of the spur gear 48 may be accomplished by any suitable means, such as by hand or mechanically by a small independently driven motor 50. The upper end of the bushing 42 extends inwardly to form an annular threaded ring portion 51 which engages the threads 46 on the collar 45.

It will be evident at this point, therefore, that rotation of the spur gear 48 will rotate the collar 45 and, because of its threaded engagement with the ring portion 51 of bushing 42, the collar will move downwardly from the position thereof shown in FIG. 3. Since the bushing 42 is held against rotation and is keyed to the neck 41 of the actuating piston 27, this latter piston will also be unable to rotate, although it is free to move in an axial direction. Thus, as the collar 45 is adjusted downwardly, it bears against the upper end of the neck 41, thereupon also forcing the actuating piston 27 downwardly. Since this piston is also in contact with the adjusting nut 31, this latter nut will also move downwardly and carry with it its associated rod 12 and the piston 37 on the bottom end thereof. Alternatively, the actuating piston 27 could be driven downwardly first by introducing hydraulic fluid under pressure into the recess 26 thereabove and thereafter rotating the spur gear 48 to drive the collar 45 downwardly to the required position thereof for the necessary work stroke.

FIG. 4 illustrates the positions of the various parts after an adjustment has been made to lower the actuating piston 27 downwardly so that it may have a shorter working stroke. If it is assumed for purposes of illustration, that the working stroke in FIG. 3 is 6 inches, then for a 2-inch working stroke, the actuating piston 27 may be moved downwardly through a distance of 4 inches by the mechanism just described, and of course, it will be held in that position and prevented from moving upwardly by reason of the fact that the upper end of the neck 41 bears against the lower end of the collar 45.

FIG. 5 illustrates an adjustment of the actuating piston through a still different distance. FIG. 5 is intended to show the piston 27 after it has been adjusted downwardly for approximately 3 inches so that the working stroke will be only 3 inches. The operation of the machine for accomplishing the molding operation will be the same in FIGS. 4 and 5 as above-described with respect to FIG. 3. In these cases, however, the axial distance between the upper surface of the enlarged portion 28 and the surface 24 will be somewhat greater than that shown in FIG. 3, but nevertheless, the hydraulic fluid under pressure will be delivered through the inlet 29 into the space 30, thereupon forcing the piston 27 and adjusting nut 31 and pull rod 12 downwardly to the stop piston 38, the only difference being that in order to reach this position, the actuating piston has moved downwardly only a matter of 2 or 3 inches rather than the full 6 inches, as shown in FIG. 3. At this point, the operation continues as before, namely, when the actuating pistons bottom against their associated stop pistons 38, they remain there for a few seconds to effect a partial cure. At that point then, the actuating piston and stop piston, as well as the adjusting nut and pull rod 12 all move downwardly together for the final finishing stroke and dwell.

In all instances, a suitable timing device is utilized for decompressing the space below the stop piston 38, so that after a predetermined period of time, after the actuating piston has contacted the stop piston, such decompression will then allow the pressure on top of the piston 27 to continue movement of the parts downwardly to the lowermost position thereof, as above described for the final finishing stroke and dwell.

Reference will now be made to FIG. 6 of the drawings, which is a schematic illustration of the hydraulic system for operating the compression molding machine of the present invention. In general, the circuitry and operation thereof, is similar to that disclosed in the above referred to Carrieri and Skinner copending application, except that an additional portion is injected into the circuit for the purpose of decompressing or bleeding the pressure from under the stop piston at a predetermined time during the working stroke. The condition of the hydraulic system in FIG. 6 is with the uppermost slide in its upper position just prior to the beginning of the rapid closing stroke.

Initially, the solenoid 52 will be energized to open valve 53 and simultaneously operate the main pump 54. Thereupon, fluid will flow out of the pushback cylinders 14 through conduit 55 and valve 53, through conduit 56 and will be pumped through the line 57 and from there will flow through either an unloaded relief valve 58 or through a suitable and separate dump valve.

The setting of the pump 54 will determine the speed of movement of the slide. Such pump may be of any suitable and well-known design which is adjustable to regulate the rate of flow of fluid therethrough. The pump can be set for any delivery rate desired from zero on up. As mentioned hereinabove, a suitable limit switch is mechanically actuated by downward movement of the slide so that such slide will stop moving only a very short distance prior to contact with the plastic material in the lower mold part. If desired, suitable means may also be provided so that as the upper slide nears the end of its rapid closing stroke, it will be caused to decelerate. The pump may be automatically regulated to cause such slowing down as in the above referred to application. When the upper mold has thus been brought to a stop, the locking latches 16 will be closed by operation of the solenoid operated valve 59. After the locking latches are in position, the machine is ready to begin its working stroke and at this time, fluid is then pumped by the main pump 54 through the conduit 60 to the actuating cylinders 18, thereupon building up the hydraulic pressure in the annular recess 30 above the actuating piston 27, thereby to move this piston, the adjusting nut 31, and pull rod 12 downwardly until the piston reaches the stop piston 38.

At this point, the actuating piston, the pull rods and the upper mold part cannot move any farther because the fluid pressure in the annular recess 39 produces an upward force which is greater than the downward force produced above the piston 27. These parts then remain in this position for the necessary period of time, as above described, whereupon decompression of the annular recess 39 will take place by reason of the operation of a timer device which will deenergize the valve 61, thereby directing the fluid from the recess 39 to tank. The numeral 62 represents a relief valve which is utilized to set the pressure at which the stop pistons 38 are to operate.

The slide then bottoms on the surface of the material and is held there until the completion of the cure. The holding pump 63 may be used, if desired, to pump fluid to the actuating cylinders and the pressure may then be built up to a predetermined amount, which is determined by the relief valve 58. When such predetermined pressure is reached, the main pump 54 will return to neutral and the holding pump 63 will maintain the pressure until the cure has been completed.

After the molding process has been completed, decompression may then take place, either through a separate decompression valve or, through the relief valve 58. This will relieve the pressure on the tension rods, so that the fluid pressure in the counterbalancing cylinder associated with each of the actuating units will return the various parts back to their original positions. For example, if the full working stroke is used, then the fluid pressure in the counterbalancing cylinder will return the parts upwardly until the actuating piston 27 reaches the uppermost position thereof, as shown in FIG. 3. On the other hand, if adjustment has been made for a shorter work stroke, wherein the upper position of the piston 27 will be as shown in either FIGS. 4 or 5, such fluid pressure will return the parts to such upper position.

The pull rods must also be positively moved, however, and this is done by a small pressure compensated pump 64 which is always on and moves the rods when the pressure is relieved. At this point then, operation of the valve 59 will open the locking latches 16 and the pumping of the fluid in the reverse direction through conduit 56 will then return the slide to its uppermost position. This is accomplished by setting the main pump to displace the fluid back into the pushback cylinders 14. Again, during upward movement of the slide, the slide ejectors may be operated in the usual and well-known manner by operation of an ejector pump 65.

It will be evident, of course, that if the fluid pressure in the counterbalancing cylinders 37 is hydraulic, then it will be necessary to provide a suitable outlet, usually in the bottom of the cylinder, through which the hydraulic fluid may bleed under pressure, due to downward movement of the pull rod. On the other hand, if the fluid is air, then of course, it is compressible and no such outlet needs to be provided.

It is thus apparent from the foregoing description that we have provided a novel construction of compression molding machine which has numerous advantages over those heretofore known. For example, the machine being of the vertical type, the rapid closing stroke of the upper mold part may be accomplished merely by relieving the hydraulic pressure in the pushback cylinders, so that the slide may move downwardly by gravity. This may eliminate the use of mechanical and hydraulic elements which otherwise would be necessary to force the mold part to a closed position.

Also, the weight of the upper slide has been decreased by reason of the fact that the pull rods and the actuating mechanism for adjusting them are mounted in the lower part of the press and need not be carried by the upper slide. Thus, less power may be required to return the slide and upper mold part to its uppermost position.

Furthermore, the ability to adjust the length of the working stroke is a definite time-saving advantage, because it eliminates the wasted part of the stroke, where no work is being accomplished. The ability to adjust each corner of the upper slide independently enables the production of products of uniform thickness. During the initial part of the working stroke down to the point where the actuating piston comes against the stop piston, one side may bottom before another until the entire cavity is filled, and then all corners will bottom, thereby providing the necessary and desirable uniform thickness.

The provision of the finishing stroke is also advantageous in producing an improved finished surface on the product because the slide will bottom on the surface of the material and will be held there until completion of the cure. This added advantage results from the fact that the entire cavity of the mold will be filled and the uniform wall thickness achieved prior to the commencement of the final finishing stroke.

Changes may be made in the form, construction and arrangement of parts from those disclosed herein without in any way departing from the spirit of the invention or sacrificing any of the attendant advantages thereof, provided however, that such changes fall within the scope of the claims appended hereto.

We claim:
1. A vertical compression molding press comprising:
   a. an upper movable slide having an upper mold part mounted thereon;
   b. a bed having a lower mold part mounted thereon;
   c. means for moving said upper slide and mold part thereon downwardly toward said lower mold part through a rapid closing stroke;
   d. means for stopping said upper mold part for a predetermined time period at the end of said rapid closing stroke;
   e. means for moving said upper mold part through an initial working stroke for at least partially filling the cavity between the mold parts with the material to be molded;
   f. means for causing a dwell of said upper mold part for a time period at the end of said initial working stroke; and
   g. means for thereafter moving said upper mold part through a final finishing working stroke, and for causing a dwell thereof at the end of said last-named stroke for completion of the molding process.

2. The combination of elements defined in claim 1, wherein said means for stopping the downward movement of said upper mold part at the end of the rapid closing stroke thereof stops said upper mold part short of contact with the material to be molded in said lower mold part.

3. The combination of elements defined in claim 1 including movable stop means to stop movement of said upper mold part at the end of the initial working stroke thereof, and means to release said movable stop means, thereby to permit movement of said upper mold part through the final finishing work stroke thereof.

4. A vertical compression molding press comprising:
   a. an upper movable slide having an upper mold part mounted thereon;
   b. a bed having a lower mold part mounted thereon into the cavity of which a quantity of a material to be molded may be placed;
   c. means supporting said upper slide, and mold part thereon, in the uppermost position thereof, and for moving said slide downwardly through a rapid closing stroke toward the lower mold part;
   d. a plurality of actuating cylinders below said bed;
   e. a like plurality of pull rods, each extending upwardly into said slide, and each secured at its lower end within one of said actuating cylinders;
   f. locking means interposed between said slide and each of said rods when the slide has completed the rapid closing stroke thereof, whereby downward movement of said pull rods will pull said slide downwardly therewith; and
   g. means in each of said actuating cylinders to exert a downward force on the rod associated therewith, thereby to move said slide and upper mold part through the working stroke thereof against the material to be molded.

5. The combination of elements defined in claim 4, wherein the means for securing the lower end of each said rod within an actuating cylinder includes an axially movable adjusting nut threadedly engaging the rod associated therewith.

6. The combination of elements defined in claim 4, wherein said last-named means is hydraulically actuated.

7. The combination of elements defined in claim 4, wherein said last-named means includes an actuating piston which, when moved downwardly, will also move downwardly its associated pull rod.

8. The combination of elements defined in claim 7, combined with hydraulic means for actuating said piston.

9. The combination of elements defined in claim 5, wherein said means to pull downwardly on the associated rod includes an actuating piston above said adjusting nut, and hydraulic means for moving said piston and nut downwardly.

10. The combination of elements defined in claim 4, including stop means in each of said actuating cylinders to stop downward movement of said slide and upper mold part for a time period before completion of the working stroke thereof, and means to render said stop means ineffective at the end of said time period, thereby to enable said slide and upper mold part to complete the working stroke thereof.

11. The combination of elements defined in claim 4, combined with means for adjusting said last-named means to regulate the length of the working stroke of said slide and upper mold part.

12. The combination of elements defined in claim 7, and means to adjust the position of said actuating piston with respect to the pull rod associated therewith, thereby to regulate the length of working stroke of said slide and upper mold part.